United States Patent
Matsuda et al.

(10) Patent No.: US 8,570,354 B2
(45) Date of Patent: Oct. 29, 2013

(54) PRINTING IMAGE DATA GENERATING DEVICE, THERMAL TRANSFER PRINTER, AND COMPUTER PROGRAM

(75) Inventors: Koichi Matsuda, Minato-ku (JP); Haruki Takeuchi, Minato-ku (JP); Yoshitaka Nomura, Minato-ku (JP); Eri Shimoi, Minato-ku (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 12 days.

(21) Appl. No.: 13/439,956

(22) Filed: Apr. 5, 2012

(65) Prior Publication Data

US 2012/0256999 A1    Oct. 11, 2012

(30) Foreign Application Priority Data

Apr. 8, 2011   (JP) .................. 2011-085986

(51) Int. Cl.
*B41J 2/00* (2006.01)
(52) U.S. Cl.
USPC ......................................................... 347/193
(58) Field of Classification Search
USPC ............... 347/188, 191, 193, 213, 218, 219;
358/1.9, 3.1, 447, 453;
400/120.01–120.04, 120.09, 120.13,
400/124.1
See application file for complete search history.

(56) References Cited

U.S. PATENT DOCUMENTS 6,091,436 A * 7/2000 Kuwabara ..................... 347/195

FOREIGN PATENT DOCUMENTS

JP    2000-015886    1/2000

* cited by examiner

*Primary Examiner* — Hai C Pham
(74) *Attorney, Agent, or Firm* — Oblon, Spivak, McClelland, Maier & Neustadt, L.L.P.

(57) ABSTRACT

A printing image data generating device generates printing image data for a thermal transfer printer that heats a thermal head generating friction force depending on grayscale values to thermally transfer ink. The printing image data generating device includes: an image data acquirer configured to acquire image data as a printing subject; a density deviation line specifying section configured to specify density deviation lines at which density after printing is estimated to deviate from desired density attributed to sudden change in the friction force; a correction-subject pixel specifying section configured to specify, as a correction-subject pixel, a pixel whose variation degree of the grayscale value is lower than a predetermined value; a correcting section configured to correct the grayscale value of the specified correction-subject pixel in such a direction as to eliminate density deviation; and a generating section configured to generate the printing image data based on image data after correction.

11 Claims, 8 Drawing Sheets

PRINTING IMAGE DATA GENERATING DEVICE, THERMAL TRANSFER PRINTER, AND COMPUTER PROGRAM

CROSS REFERENCE TO RELATED APPLICATION

This application claims priority to Japanese Application Number 2011-085986, filed on Apr. 8, 2011, the entire contents of which are hereby incorporated by reference.

BACKGROUND OF THE DESCRIPTION

1. Field of the Invention

The present invention relates to a printing image data generating device that generates printing image data used for a thermal transfer printer, a thermal transfer printer, and a computer program.

2. Description of the Related Art

As one example of the thermal transfer printer, Japanese Patent Laid-open No. 2000-15886 discloses a printing device that conveys a ribbon to which ink (dye) of plural colors is applied together with paper in the state in which the ribbon is pressed against the paper by a thermal head and heats the ribbon by current application to a heat generating resistor of the thermal head to thermally transfer the ink of the ribbon to the paper. In this printer, when the heat quantity of the thermal head is larger, the amount of ink transfer to the paper is larger and higher density is obtained. When the heat quantity of the thermal head is smaller, the amount of ink transfer to the paper is smaller and lower density is obtained. Based on this characteristic, this printer generates printing image data obtained by expressing the image as the printing subject by pixel-by-pixel grayscale values in advance and performs thermal transfer (printing) on a line-by-line basis by carrying out heating control of the thermal head so as to obtain the heat quantity corresponding to the grayscale values of the pixels configuring this printing image data.

The printing image data used for this thermal transfer printer is generated based on the image data as the printing subject by an image data generating device realized through running of a computer program referred to also as device driver and printer driver in a computer such as a personal computer.

SUMMARY OF THE DESCRIPTION

In the case of printing image data in which plural photographs are disposed in one page like e.g. a photo album, a horizontal streak is generated along a line of the horizontal frame part of the photograph and the printing quality is remarkably deteriorated in some cases.

As a result of pursuit of the cause thereof, the following fact is found. Specifically, when the ribbon and paper are so conveyed as to be pressed against each other by the thermal head, friction force depending on the heat quantity of the thermal head, i.e. the grayscale value of the pixel, is generated at the pressed part, and this friction force per one line suddenly changes at the horizontal frame part of the photograph. This sudden change is the cause. More specifically, when heating control of the thermal head is so carried out that desired density is obtained on condition that the conveyance speed of the paper relative to the thermal head is a predetermined speed, if the friction force per one line suddenly changes, the conveyance speed of the paper will be temporarily increased or decreased and the density after the printing will deviate from the desired density due to the speed difference from the predetermined speed. The density deviation of the pixel with marked variation in the grayscale value in a predetermined area including peripheral pixels, among the plural pixels configuring the line associated with this density deviation, is inconspicuous. However, the density deviation of the pixel with scarce variation in the grayscale value in the above-described predetermined area (blanket-printed part with no grayscale change or part that has scarce grayscale change and is equivalent to blanket-printed part) is conspicuous as a streak, which deteriorates the printing quality.

The present invention is made with focus on such a problem and an object thereof is to provide a printing image data generating device, a thermal transfer printer, and a computer program that suppress or eliminate the influence of density deviation to enhance the printing quality even if data including sudden grayscale value change that possibly generates the density deviation is included in image data.

The present invention takes the following measures in order to achieve this object.

Specifically, the printing image data generating device of the present invention is a printing image data generating device that generates printing image data used for a thermal transfer printer that performs heating for a thermal head depending on the grayscale values of pixels to thereby thermally transfer ink of a ribbon to paper on a line-by-line basis. The thermal head presses the paper conveyed along a sub scanning direction together with the ribbon and involves generation of friction force depending on the grayscale value of the pixel at the pressed part. The printing image data generating device includes an image data acquirer configured to acquire image data as a printing subject, and a density deviation line specifying section configured to specify density deviation lines at which density after printing is estimated to deviate from desired density attributed to sudden change in the friction force per one line among a plurality of lines configuring the image data acquired by the image data acquirer based on the grayscale values of the pixels configuring the lines. The printing image data generating device further includes a correction-subject pixel specifying section configured to specify, as a correction-subject pixel, a pixel whose variation degree of the grayscale value in a predetermined evaluation area including at least peripheral pixels adjacent on both sides in the sub scanning direction is lower than a predetermined value among a plurality of pixels configuring the density deviation lines specified by the density deviation line specifying section. The printing image data generating device further includes a correcting section configured to correct the grayscale value of the correction-subject pixel specified by the correction-subject pixel specifying section in such a direction as to eliminate density deviation, and a generating section configured to generate the printing image data based on image data after correction, obtained by the correcting section.

The predetermined evaluation area means an area that includes the peripheral pixels adjacent on both sides of the pixel as the evaluation subject as to whether or not it is the correction-subject pixel in the sub scanning direction, and includes the pixels that are separate from the evaluation-subject pixel by a predetermined distance along the sub scanning direction. The size of this area is accordingly set.

In this manner, the density deviation lines at which the density after printing is estimated to deviate from the desired density attributed to sudden change in the friction force per one line are specified among the plural lines configuring the image data as the printing subject based on the grayscale values of the pixels configuring the respective lines. Subsequently, the correction-subject pixel whose variation degree of the grayscale value in the predetermined area including at least the peripheral pixels existing on both sides in the sub scanning direction is lower than the predetermined value is specified among the plural pixels configuring the specified density deviation lines. Then, the grayscale value of the specified correction-subject pixel is corrected in such a direction as to eliminate density deviation, and thermal transfer is performed based on the printing image data based on the image data after correction. Therefore, density deviation can be decreased or eliminated and the printing quality can be enhanced by correcting the grayscale value of the pixel that has a low variation degree of the grayscale value in the predetermined area including peripheral pixels and involves conspicuous density deviation, among the plural pixels existing on the lines associated with density deviation, in such a direction as to eliminate the density deviation.

To make the correction of density deviation proper and further enhance the printing quality, it is preferable for the density deviation line specifying section to compare the grayscale values between lines adjacent to each other in the sub scanning direction to thereby specify a start line whose difference in the friction force per one line from a line of previous thermal transfer surpasses a predetermined value among the plurality of lines configuring the image data, and specify lines from the specified start line to a line for which thermal transfer is performed a further predetermined number of lines later as the density deviation lines.

As one configuration for specifying whether or not the line of interest is the start line, it is desirable for the density deviation line specifying section to specify, as the start line, a line that meets a determination condition that the line has at least a predetermined number of pixels whose grayscale difference from a pixel that exists on the line of previous thermal transfer and is adjacent along the sub scanning direction surpasses a predetermined threshold.

To realize proper correction appropriate for the amount of density deviation and further enhance the printing quality, it is effective for the correcting section to perform correction by using a correction value with magnitude depending on at least one of the predetermined threshold and the predetermined number.

If the above-described printing image data generating device is incorporated in a thermal transfer printer, printing with enhanced printing quality can be realized even when image data that does not pass through the above-described printing image data generating device is input, and it is also possible to omit maintenance of the peripheral computer such as a host computer.

It is also possible to specify steps carried out by the above-described printing image data generating device in terms of a program. Specifically, the computer program of the present invention is a computer program that causes a computer to generate printing image data used for a thermal transfer printer that performs heating for a thermal head depending on the grayscale values of pixels to thereby thermally transfer ink of a ribbon to paper on a line-by-line basis. The thermal head presses the paper conveyed along a sub scanning direction together with the ribbon and involves generation of friction force depending on the grayscale value of the pixel at the pressed part. The computer program causes the computer to execute processing including acquiring image data as a printing subject, and specifying density deviation lines at which density after printing is estimated to deviate from desired density attributed to sudden change in the friction force per one line among a plurality of lines configuring the acquired image data based on the grayscale values of the pixels configuring the lines. The processing further includes specifying, as a correction-subject pixel, a pixel whose variation degree of the grayscale value in a predetermined evaluation area including at least peripheral pixels adjacent on both sides in the sub scanning direction is lower than a predetermined value among a plurality of pixels configuring the specified density deviation lines. The processing further includes correcting the grayscale value of the specified correction-subject pixel in such a direction as to eliminate density deviation, and generating the printing image data based on image data after correction. Also by running this computer program, the operation and effects provided by the above-described printing image data generating device can be achieved.

Because the present invention has the above-described configuration, the grayscale value of the pixel that has a low variation degree of the grayscale value in the predetermined area including at least peripheral pixels adjacent on both sides in the sub scanning direction and involves conspicuous density deviation, among the plural pixels existing on the lines associated with density deviation, is corrected in such a direction as to eliminate the density deviation. Thus, the density deviation can be decreased or eliminated and the printing quality can be enhanced. Therefore, a printing image data generating device, a thermal transfer printer, and a computer program with enhanced printing quality can be provided.

DETAILED DESCRIPTION OF THE PREFERRED EMBODIMENTS

A printing system according to one embodiment of the present invention will be described below with reference to the drawings.

Figure 1:
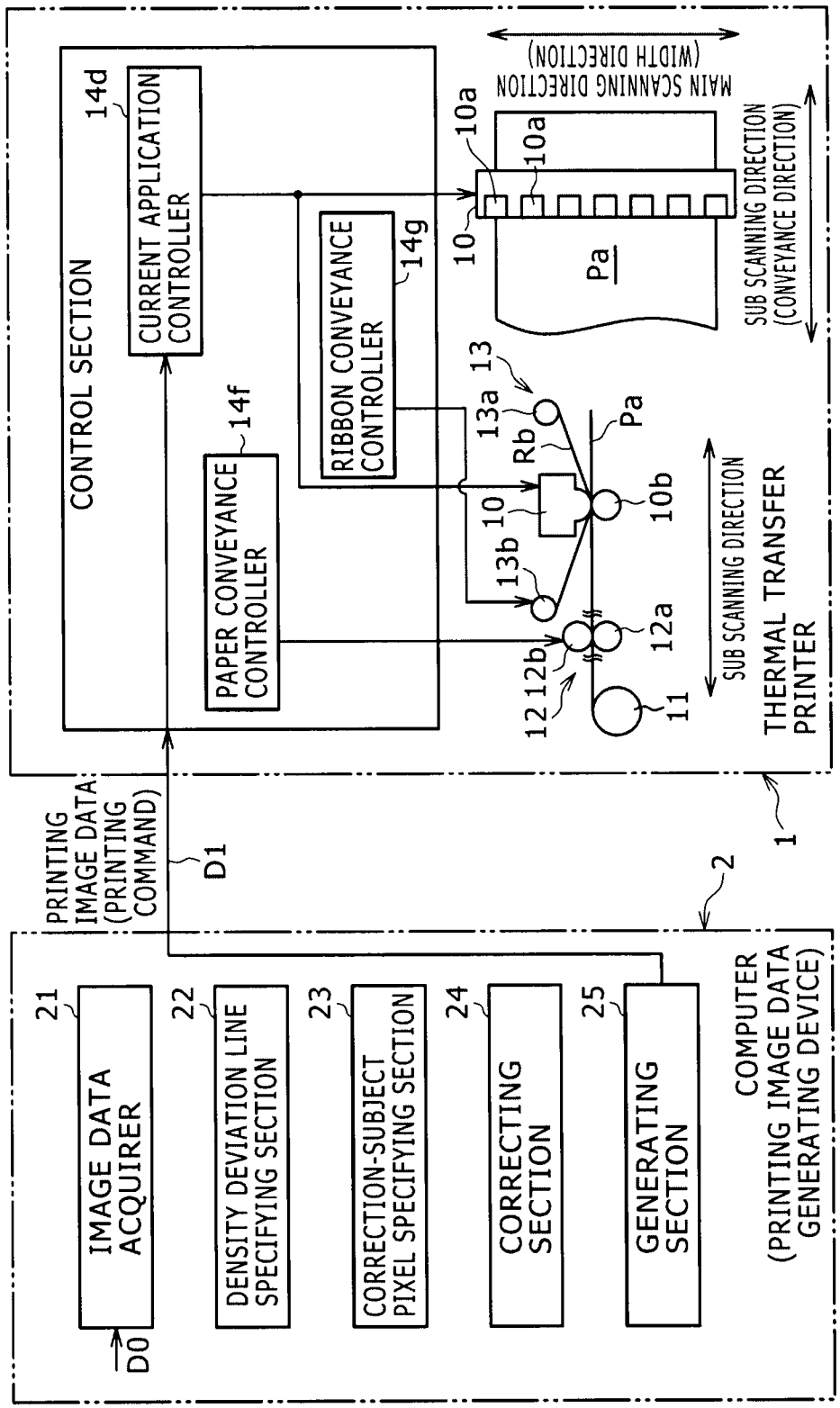
FIG. 1 is a configuration diagram schematically showing a printing system according to one embodiment of the present invention.
Figure 2:
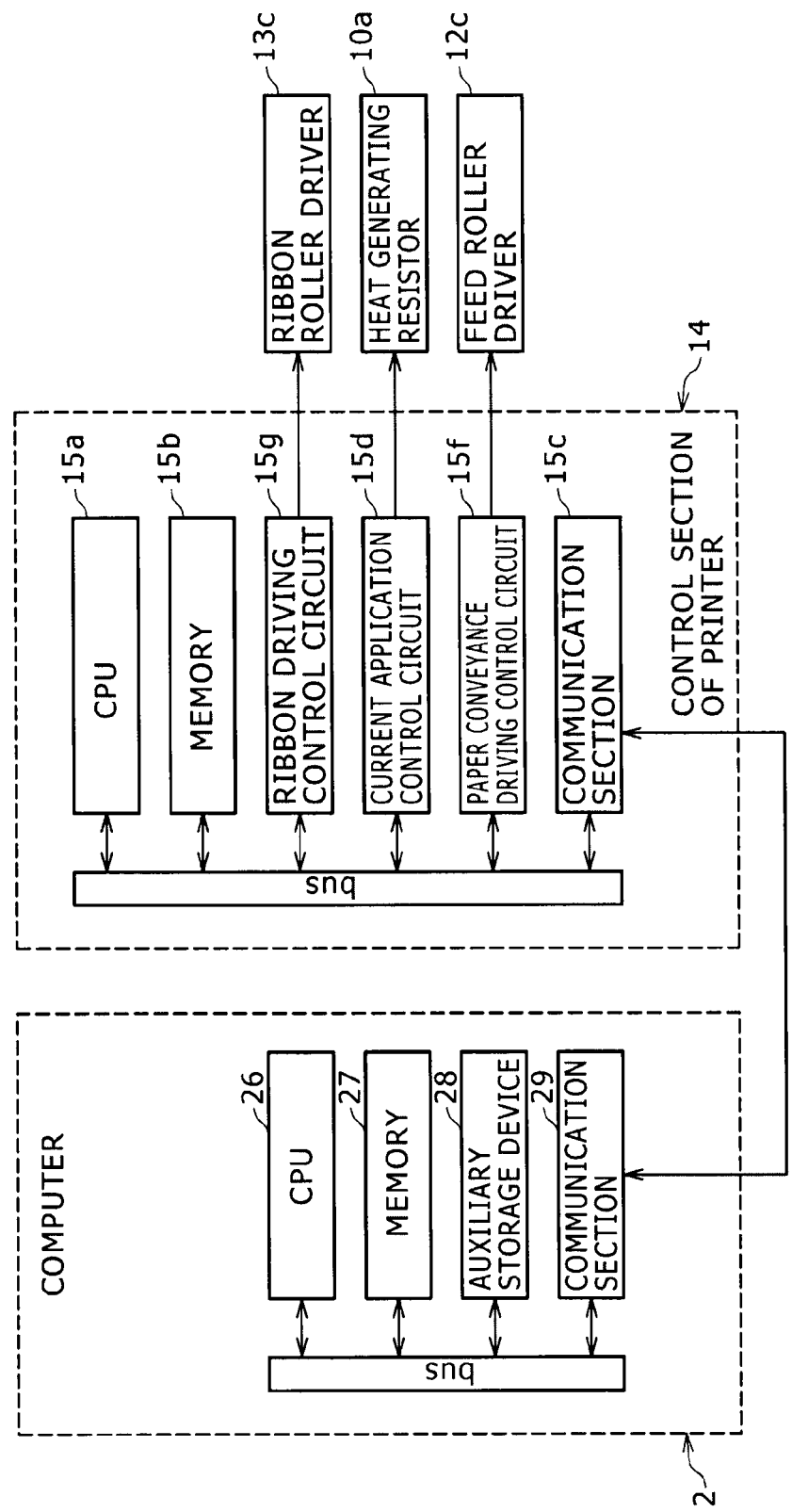
FIG. 2 is a configuration diagram schematically showing hardware of a thermal transfer printer and a computer that configure the printing system.

As shown in FIG. 1 and FIG. 2, the printing system includes a thermal transfer printer 1 and a computer 2 that is so configured as to be capable of communicating with the thermal transfer printer 1 and generates printing image data D1 used for the thermal transfer printer 1.

The thermal transfer printer 1 is a printing device having the following configuration. Specifically, as shown in FIG. 1, the thermal transfer printer 1 has a thermal head 10 in which plural heat generating resistors 10a that generate heat through current application are so disposed as to configure one line, and a paper feeder 11 that holds paper Pa such as a roll paper in such a manner as to be capable of feeding it. Furthermore, the thermal transfer printer 1 has a paper conveyer 12 that conveys the paper Pa, a ribbon conveyer 13 that feeds a ribbon Rb to the thermal head 10, and a control section 14 that controls driving of the respective units 10 to 13. The thermal transfer printer 1 heats the ribbon Rb by current application to the thermal head 10 to thermally transfer colored ink applied to the ribbon Rb from the ribbon Rb to the paper Pa. In the present specification, the arrangement direction of the heat generating resistors 10a is referred to as the main scanning direction and the conveyance direction perpendicular to the main scanning direction is referred to as the sub scanning direction.

As shown in FIG. 1, the area corresponding to one screen as the printing subject in the paper Pa is expressed by plural pixels (dots) arranged in a matrix manner along each of the main scanning direction and the sub scanning direction, and is expressed by plural lines when the pixels arranged on one column along the main scanning direction are considered as one line.

The heat generating resistor 10a is an element that generates heat through current application thereto and is provided corresponding to each of pixels (dots) arranged on one column along the main scanning direction. The heat generating resistor 10a thermally transfers the ink applied to the ribbon Rb to the paper Pa by the heat generation caused by the current application to print the corresponding pixel. In this thermal transfer printer, when the heat quantity of the thermal head 10 is larger, the amount of ink transfer to the paper Pa is larger and higher density is obtained. When the heat quantity of the thermal head 10 is smaller, the amount of ink transfer to the paper Pa is smaller and lower density is obtained. Based on this characteristic, this thermal transfer printer generates the printing image data D1 obtained by expressing the image as the printing subject by pixel-by-pixel grayscale values (referred to also as pixel values) in advance and realizes printing on a line-by-line basis by carrying out current application control (heating control) for the plural heat generating resistors 10a while conveying the paper Pa and the ribbon Rb in the sub scanning direction so as to obtain the heat quantity corresponding to the grayscale values of the pixels configuring this printing image data D1. Specifically, the printing image data D1 is data obtained by expressing one pixel by the grayscale value of each of the kinds of ink, such as yellow, magenta, and cyan. As shown in FIG. 1, a platen roller 10b is provided at the position opposed to the thermal head 10 and the thermal head 10 and the platen roller 10b are so configured as to be capable of being relatively brought close to and away from each other. When printing is performed, the ribbon Rb and the paper Pa are pressed against each other by the thermal head 10 and the platen roller 10b.

The paper conveyer 12 is composed mainly of a feed roller 12a and a pinch roller 12b and conveys the paper Pa through rotational driving of the feed roller 12a by a feed roller driver 12c (see FIG. 2) configured by using a motor and so forth in the state in which the paper Pa is sandwiched by both rollers 12a and 12b.

The ribbon conveyer 13 conveys the ribbon Rb between a feed ribbon roller 13a and a take-up ribbon roller 13b. As one specific example, rotational driving of the take-up ribbon roller 13b is performed by a ribbon roller driver 13c (see FIG. 2) configured by using a motor and so forth, to carry out operation of reeling out the ribbon Rb from the feed ribbon roller 13a toward the thermal head 10 and reeling in the ribbon Rb that has reached the thermal head 10 into the take-up ribbon roller 13b.

As shown in FIG. 1, the control section 14 has a current application controller 14d, a paper conveyance controller 14f, and a ribbon conveyance controller 14g, and controls current application to the heat generating resistors 10a and driving of the ribbon conveyer 13 and the paper conveyer 12 based on the printing image data D1 received from the external (computer 2) to thereby realize the series of operation necessary for printing. As shown in FIG. 2, the control section 14 is configured by a normal microcomputer unit including a CPU 15a, a memory 15b, and a communication section 15c that are connected via a bus similarly to known printers. A required program of e.g. a printing control processing routine (not shown) is written to the memory 15b, and the CPU 15a accordingly calls and runs the necessary program to thereby realize the respective sections 14d, 14f, and 14g shown in FIG. 1 in cooperation with peripheral hard resources.

As shown in FIG. 1 and FIG. 2, the paper conveyance controller 14f to control the conveyance of the paper Pa is realized by a paper conveyance driving control circuit 15f that controls driving of the feed roller driver 12c. The ribbon conveyance controller 14g to control the conveyance of the ribbon Rb is realized by a ribbon driving control circuit 15g that controls driving of the ribbon roller driver 13c.

The current application controller 14d is realized by a current application control circuit 15d shown in FIG. 2. It converts the printing image data D1 accepted from the external to pulse data that shows the number of pulses per unit time of current application to the heat generating resistors 10a on a pixel-by-pixel basis, and applies pulses whose number is in accordance with the converted pulse data to the heat generating resistors 10a to thereby control heat generation of the heat generating resistors 10a.

Figure 3:
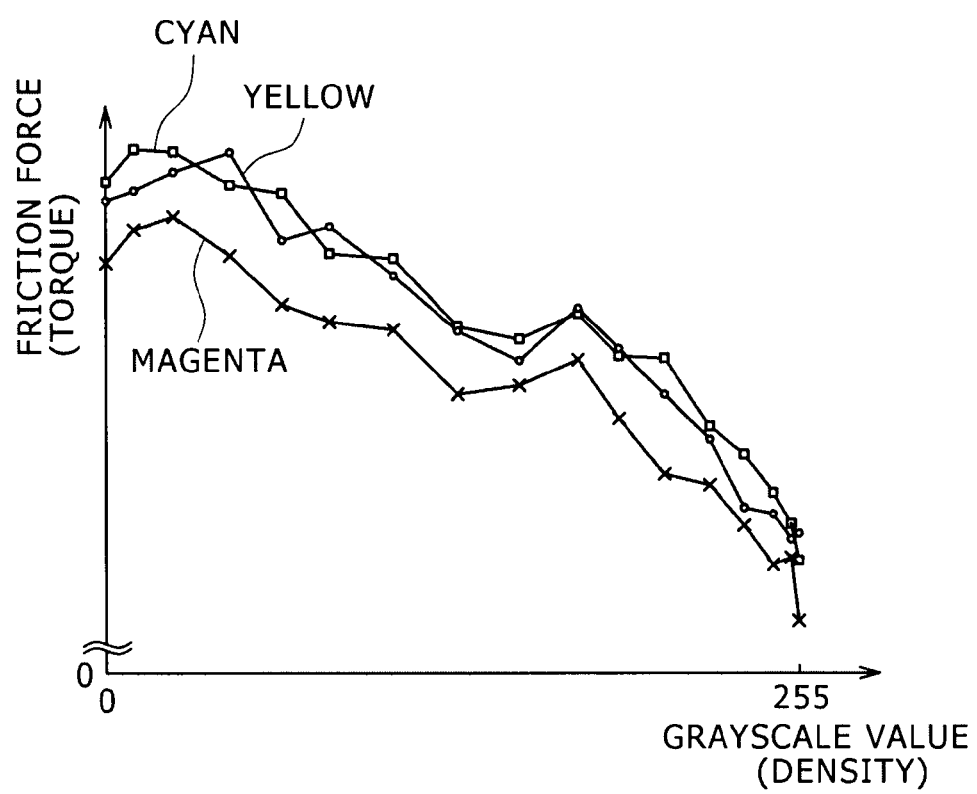
FIG. 3 is a diagram schematically showing the relationship between friction force generated at a thermal head and the grayscale value.
Figure 4:
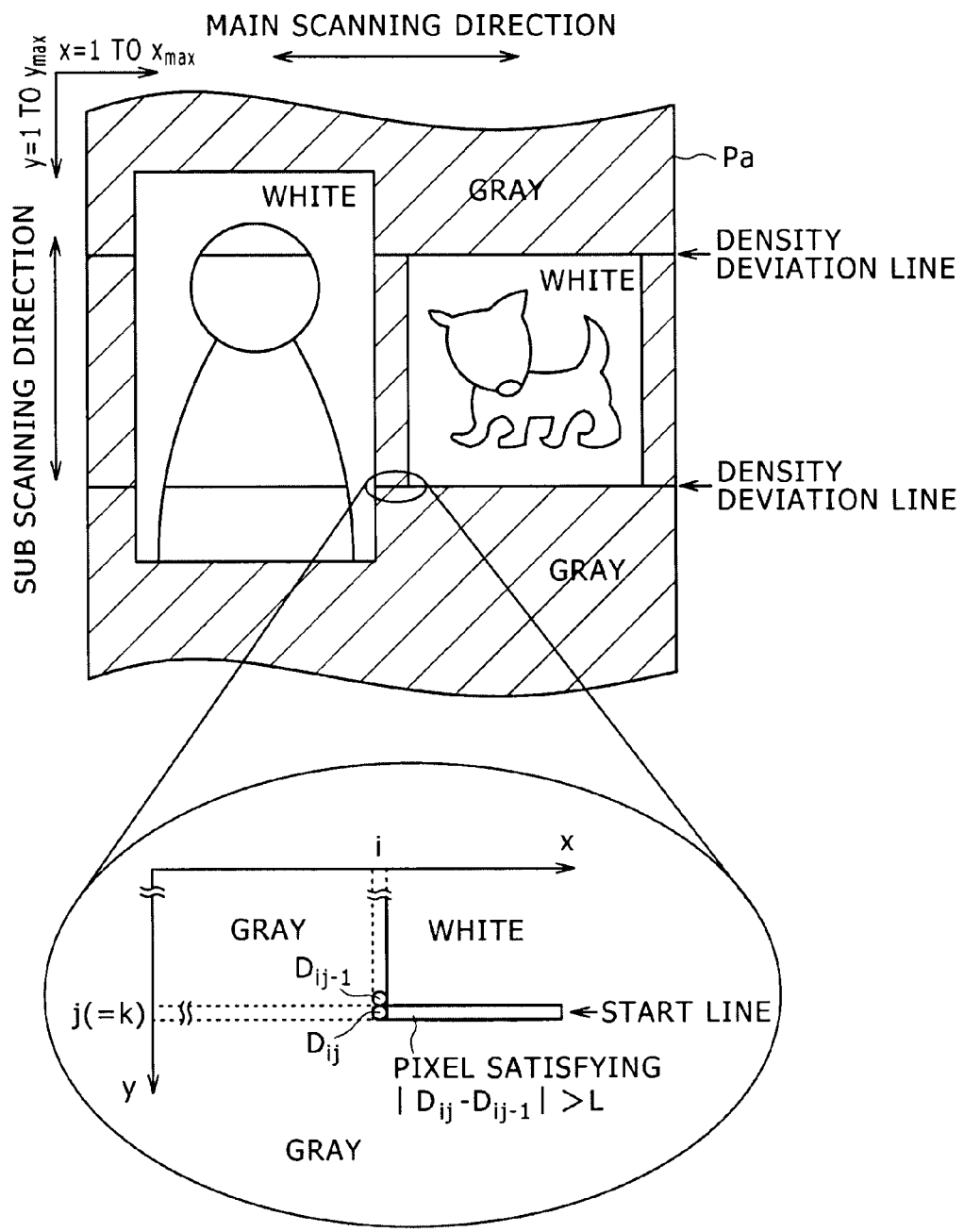
FIG. 4 is a diagram schematically showing image data as the printing subject and the occurrence state of horizontal streaks.

However, as shown in FIG. 4, if the printing image data D1 in which plural photographs are disposed in one page like e.g. a photo album is printed by using the above-described thermal transfer printer 1, a horizontal streak is generated along a certain line of the horizontal frame part of the photograph and the printing quality is deteriorated in some cases. As a result of pursuit of the cause thereof, the following fact is found. Specifically, when the ribbon Rb and the paper Pa are so conveyed as to be pressed against each other by the thermal head 10 as shown in FIG. 1, friction force depending on the heat quantity of the thermal head 10, i.e. the grayscale value of the pixel, is generated at the pressed part as shown in FIG. 3, and the friction force per one line suddenly changes at the horizontal frame part of the photograph (part whose grayscale value suddenly changes in a comparatively-wide range along the main scanning direction) as shown in FIG. 4. This sudden change is the cause. According to FIG. 3, it turns out that the friction force becomes higher when the grayscale is lower and becomes lower when the grayscale is higher and the mode of the change differs for each of the kinds of ink. Specifically, when heating control of the thermal head is so carried out that desired density is obtained on condition that the conveyance speed of the paper relative to the thermal head is a predetermined speed, if the friction force per one line suddenly changes, the conveyance speed of the paper will be temporarily increased or decreased and the density after the printing will deviate from the desired density due to the speed difference from the predetermined speed. As shown in FIG. 4, the density deviation of the pixel with marked variation in the grayscale value in a predetermined area including peripheral pixels (e.g. the horizontal frame part of the photograph), among the plural pixels configuring the line associated with this density deviation, is inconspicuous. However, the density deviation of the pixel with scarce variation in the grayscale value in the above-described predetermined area (blanket-printed part with no grayscale change or part that has scarce grayscale change and is equivalent to blanket-printed part) is conspicuous as a streak, which deteriorates the printing quality.

So, in order to generate the printing image data D1 in consideration of the influence of the above-described density deviation, the computer 2 is made to run a computer program to be described later to thereby allow this computer 2 to function as a printing image data generating device. Specifically, the computer 2 to generate the printing image data D1 used for the thermal transfer printer 1 having the above-described configuration is configured by using a general personal computer including a CPU 26, a memory 27, an auxiliary storage device 28, and a communication section 29 that are connected via a bus as shown in FIG. 2. The CPU 26 executes a printer driver processing routine shown in FIG. 6, which is installed in the auxiliary storage device 28 such as a hard disc in advance and is referred to also as printer driver and device driver. Thus, the computer 2 realizes an image data acquirer 21, a density deviation line specifying section 22, a correction-subject pixel specifying section 23, a correcting section 24, and a generating section 25 shown in FIG. 1 in cooperation with peripheral hard resources. In the auxiliary storage device 28 in FIG. 2, required programs such as the basic program (operating system (OS)) are stored besides the computer program of the present patent application. The computer 2 and the printer 1 are so connected as to be capable of communicating with each other in a wired or wireless manner via their respective communication sections 15c and 29 as shown in FIG. 2. Although a personal computer is employed as the computer in the present embodiment, the computer may be implemented as a controller including a dedicated circuit.

Referring back to FIG. 1, the image data acquirer 21 has a role of an interface to accept image data D0 as the printing subject from other software and an external apparatus. In the present embodiment, the image data D0 is YMC-format data that shows the grayscale value of each of the kinds of ink, such as yellow, magenta, and cyan, on a pixel-by-pixel basis. Although the image data acquirer 21 acquires the image data D0 of the YMC format in the present embodiment, it is also possible to acquire RGB-format data that shows the grayscale value of each of e.g. red, green, and blue on a pixel-by-pixel basis and convert it to YMC-format data. The image data D0 may be data of another format.

The density deviation line specifying section 22 shown in FIG. 1 specifies density deviation lines among the plural lines ($y=1$ to $y_{max}$) configuring the image data D0 acquired by the image data acquirer 21 based on the grayscale values of the pixels configuring the respective lines as shown in FIG. 4. The density deviation line is the line at which the density after printing is estimated to deviate from the desired density attributed to sudden change in the friction force per one line in conveyance of the paper Pa and the ribbon Rb along the sub scanning direction. The specifying of this density deviation line is divided into a step of specifying a start line and a step of specifying density deviation lines based on the specified start line. In the step of specifying the start line, as shown at the lower part of FIG. 4, the grayscale values are compared between lines adjacent to each other in the sub scanning direction (e.g. $y=j$ and $y=j-1$) regarding all lines. Thus, among the plural lines configuring the image data D0, the line (e.g. $y=k$) whose difference in the friction force per one line from the line of the previous thermal transfer ($y=j-1$) surpasses a predetermined value is specified as the start line. In the step of specifying density deviation lines, the lines from the specified start line (e.g. $y=k$) to the line for which thermal transfer is performed a further predetermined number p of lines later (e.g. $y=k+p$) are specified as the density deviation lines (see FIGS. 5A and 5B). This predetermined number p of lines is accordingly set based on experiment and so forth.

Specifically, the determination as to whether or not the line of interest is the start line is made as follows, if the main scanning direction and the sub scanning direction are defined as x and y, respectively, and the line of interest is defined as $y=j$ and the grayscale value of the pixel of interest is expressed as $D_{xy}$, $x=i$, $y=j$ as shown in FIG. 4. Specifically, the line ($y=k$) that meets a determination condition that the line has at least a predetermined number N of pixels $D_{ij}$ whose grayscale difference from the pixel $D_{ij-1}$ ($|D_{ij}-D_{ij-1}|$), which exists on the line of the previous thermal transfer ($y=j-1$) and is adjacent along the sub scanning direction, surpasses a predetermined threshold L is regarded as the start line. The predetermined threshold L and the predetermined number N are accordingly set based on experiment and so forth. Although $|D_{ij}-D_{ij-1}|>L$ is employed as the determination condition, it is also effective to make the determination by the direction of the grayscale difference by using at least one condition of "$(D_{ij}-D_{ij-1})>L$" and "$(D_{ij}-D_{ij-1})<-L$." In the example shown in FIG. 4, the lines existing at the horizontal frame parts of a photograph shown by a rectangular frame in the diagram meet the above-described determination condition.

Figure 5A:
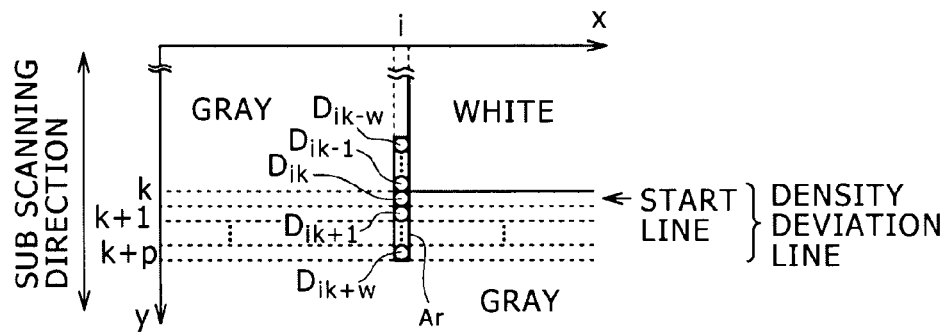
FIGS. 5A, 5B and 5C are explanatory diagrams relating to correction of the grayscale value of the image data.
Figure 5B:
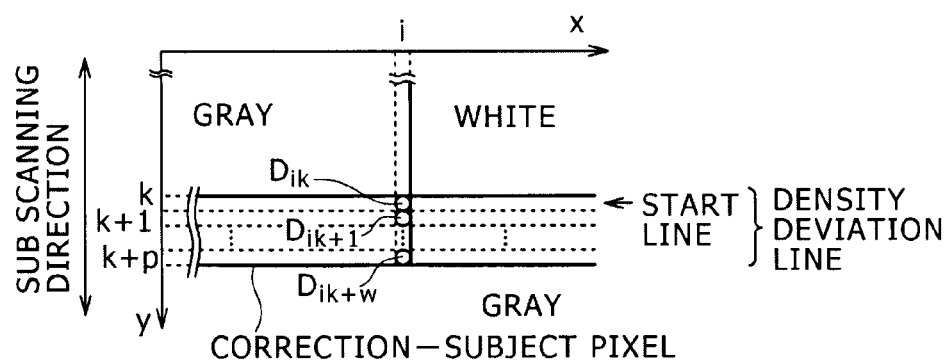
Figure 5C:
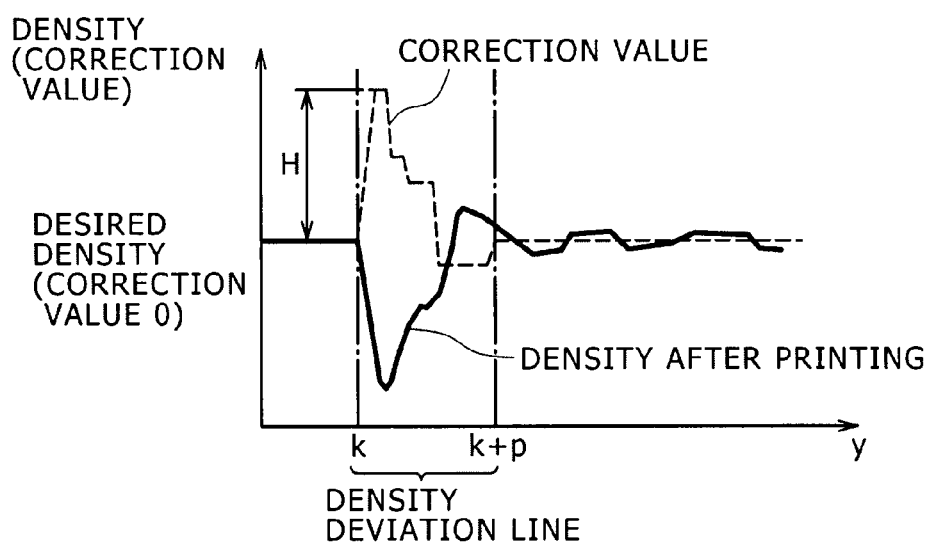

The correction-subject pixel specifying section 23 in FIG. 1 specifies, as the correction-subject pixel, the pixel $D_{ik}$ whose variation degree of the grayscale value in a predetermined evaluation area Ar including at least peripheral pixels $D_{ik-1}$ and $D_{ik+1}$ adjacent on both sides in the sub scanning direction is lower than a predetermined value among the plural pixels configuring the density deviation lines ($y=k$ to $k+p$) specified by the density deviation line specifying section 22 as shown in FIG. 5A. The predetermined evaluation area Ar means an area that includes the peripheral pixels $D_{ik-1}$ and $D_{ik+1}$ adjacent on both sides of the pixel $D_{ik}$ as the evaluation subject as to whether or not it is the correction subject in the sub scanning direction, and includes the pixels that are separate from the evaluation-subject pixel $D_{ik}$ by a predetermined distance w along the sub scanning direction. In the present embodiment, if the evaluation-subject pixel is defined as $D_{ik}$, the pixels existing in the predetermined evaluation area Ar are $D_{ik-w}, D_{ik-w+1}, \ldots, D_{ik}, \ldots, D_{ik+w-1}$, and $D_{ik+w}$ as shown in FIG. 5A. The predetermined distance w, which determines the size of the predetermined evaluation area Ar in the sub scanning direction, is accordingly set. The variation degree of the grayscale values of the pixels existing in the predetermined evaluation area Ar is expressed by the variance value of the respective grayscale values of the pixels existing in this area Ar or the spectrum obtained by performing a fast Fourier transform (FFT) analysis of the respective grayscale values. If the variance value is smaller than a predetermined value or the spectrum is distributed in a low-frequency region lower than a predetermined frequency, it is determined that this evaluation-subject pixel is the correction-subject pixel. In the example shown in FIGS. 5A and 5B, the pixels surrounded by the rectangular frame in FIG. 5B are the correction-subject pixels. In the present embodiment, the size of the predetermined evaluation area Ar in the main scanning direction is set to the size of one pixel. However, the size may be set to the size of plural pixels.

As shown in FIG. 1, the correcting section 24 corrects the grayscale value of the correction-subject pixel specified by the correction-subject pixel specifying section 23 in such a direction as to eliminate density deviation. As shown in FIG. 5B, the correcting section 24 corrects the grayscale value in such a direction as to increase the density when the grayscale changes from a lower grayscale to a higher grayscale ($D_{ij}-$ $D_{ij-1} > L$), whereas it corrects the grayscale value in such a direction as to decrease the density when the grayscale changes from a higher grayscale to a lower grayscale ($D_{ij} - D_{ij-1} < -L$). The correction value thereof is so set as to become smaller gradually as the position of the line moves from the start line (y=k) toward the line on the later printing side (y=k+p), and the peak value H of the correction value is set to a value depending on the predetermined threshold L and the predetermined number N. Specifically, the peak value H of the correction value is so set as to be higher when the predetermined threshold L and the predetermined number N are larger and conversely be lower when the predetermined threshold L and the predetermined number N are smaller. Although the correction amount is set to a value depending on the values of both of the predetermined threshold L and the predetermined number N in the present embodiment, it may be set to a value depending on either one of them.

Referring back to FIG. 1, the generating section 25 turns the image data after correction, obtained by the correcting section 24, to the printing image data D1 to thereby generate the printing image data D1 based on the image data after correction. The printing image data D1 is transmitted to the thermal transfer printer 1 together with a printing command.

Figure 6:
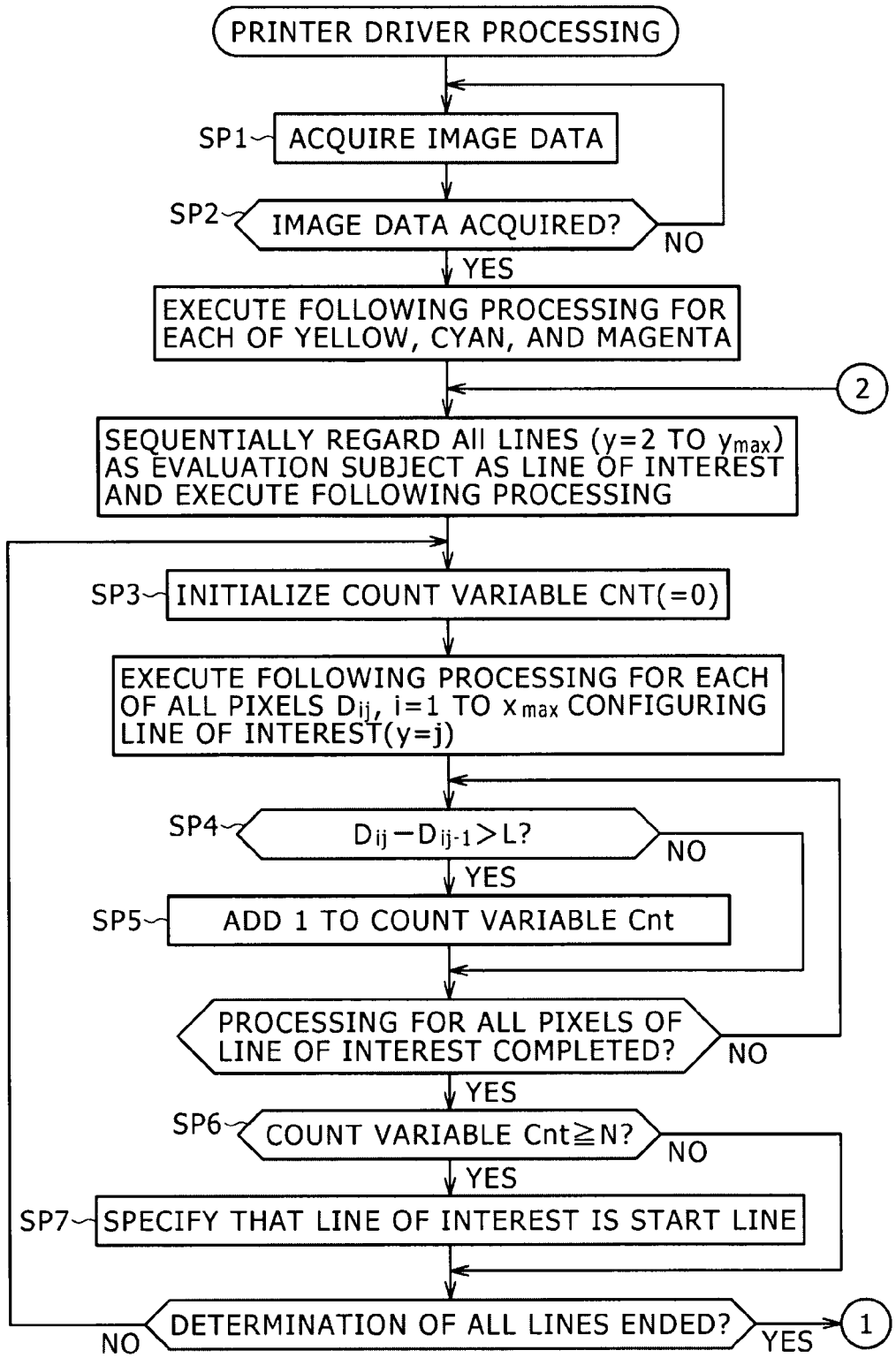
FIG. 6 is a flowchart showing a printer driver processing routine executed in the computer.

The printing system having the above-described configuration operates as follows. In the following, only correction of density deviation generated at part where the grayscale changes from a smaller value to a larger value will be explained for simplified description. However, similar processing is executed also for the opposite case. Specifically, as shown in FIG. 1 and FIG. 6, the computer 2 acquires the image data D0 as the printing subject from other software in a step SP1 and determines whether or not the image data D0 is acquired in the next step SP2. If it is determined in the step SP2 that the image data D0 is accepted (SP2: YES), the following steps SP3 to SP13 are carried out for each of yellow, magenta, and cyan.

First, as shown in FIG. 4 and FIG. 6, density deviation lines among the plural lines configuring the image data D0 are specified by carrying out the following steps SP3 to SP8. Specifically, the lines (y=2 to $y_{max}$) as the evaluation subject are sequentially regarded as the line of interest and the steps SP3 to SP7 are carried out. A count variable Cnt is initialized to 0 in the step SP3 and the following steps SP4 and SP5 are carried out for each of all pixels ($D_{ij}$, i=1 to $x_{max}$) configuring the line of interest (y=j). In the step SP4, whether or not $(D_{ij} - D_{ij-1}) > L$ is satisfied is determined. If it is determined that $(D_{ij} - D_{ij-1}) > L$ is satisfied (SP4: YES), 1 is added to the count variable Cnt in the next step SP5. After the above-described steps SP4 and SP5 have been sequentially carried out for each of all pixels configuring the line of interest (y=j), it is determined whether or not the count variable Cnt is equal to or larger than the predetermined number N in the next step SP6. If it is determined that the count variable Cnt is equal to or larger than the predetermined number N (SP6: YES), it is specified that the line of interest (y=j) is a start line in the next step SP7. When the determination as to whether or not the line of interest is a start line by the above-described steps SP3 to SP7 is performed about all lines, as shown in FIG. 5A and FIG. 7, the lines from the line specified as the start line (e.g. y=k) to the line for which thermal transfer is performed a further predetermined number p of lines later (y=k+p) are specified as density deviation lines (step SP8).

Figure 7:
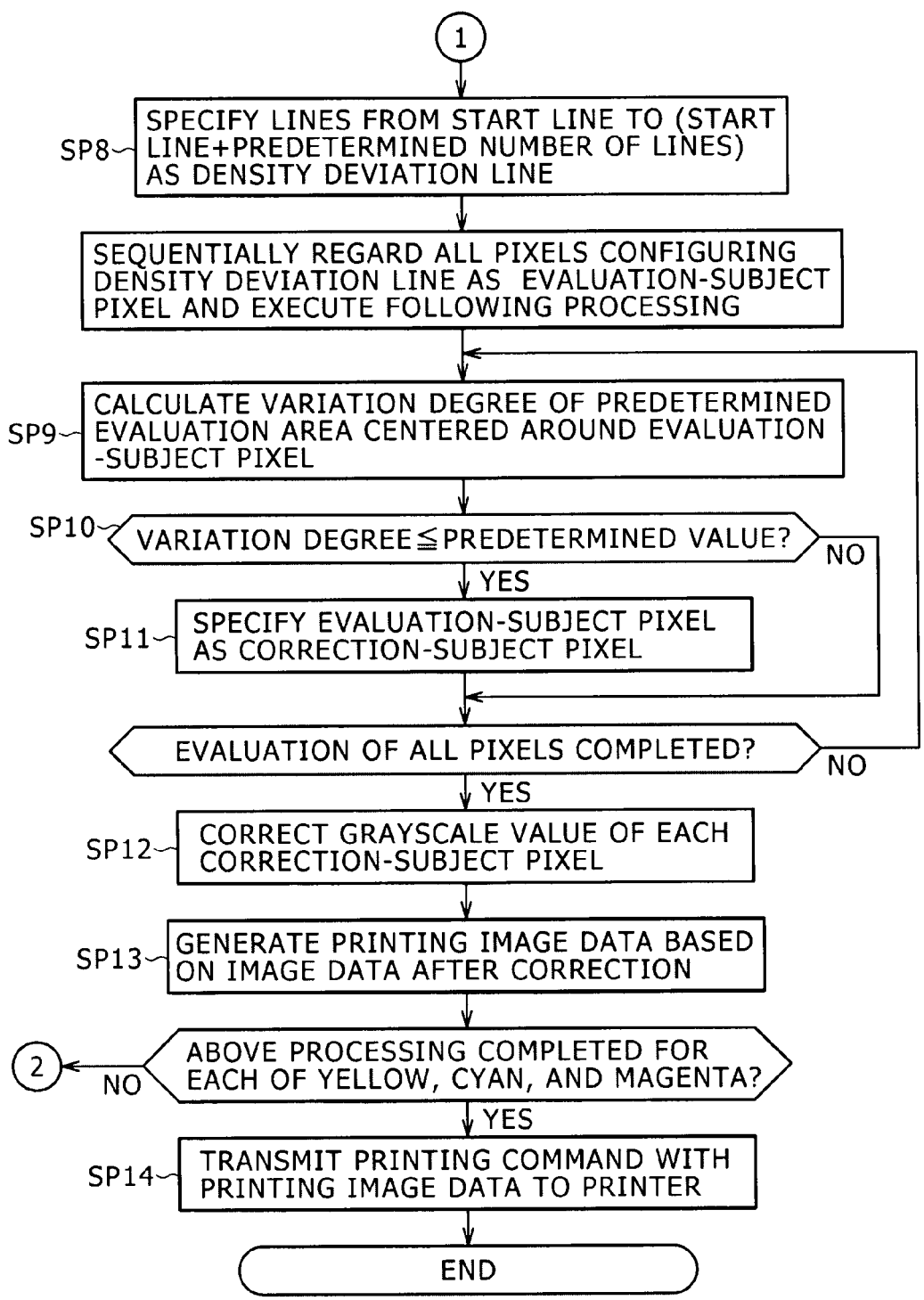
FIG. 7 is a flowchart showing the printer driver processing routine executed in the computer.

After the end of the specifying of density deviation lines by the above-described steps SP3 to SP8, the correction-subject pixel is specified among the plural pixels configuring the density deviation lines as shown in FIG. 5A and FIG. 7. Specifically, the plural pixels configuring the density deviation lines are sequentially regarded as the evaluation-subject pixel and steps SP9 to SP11 are carried out. The variation degree of the grayscale value in the predetermined evaluation area Ar including peripheral pixels is calculated in the step SP9 and it is determined whether or not the variation degree is equal to or lower than a predetermined value in the next step SP10. If it is determined that the variation degree is equal to or lower than the predetermined value (SP10: YES), it is specified that the evaluation-subject pixel is the correction-subject pixel in the next step SP11.

After the completion of the specifying of the correction-subject pixel by the above-described steps SP9 to SP11, the grayscale value of the correction-subject pixel is corrected in such a direction as to eliminate the density deviation (in such a direction as to increase the density) in the next step SP12. In this case, the correction amount set in advance as shown in FIG. 5B is used. In the next step SP13, printing image data is generated based on the image data after correction.

After the above-described steps SP3 to SP13 have been carried out for each of the respective colors (yellow, cyan, and magenta), a printing command with the printing image data is transmitted to the thermal transfer printer 1 as shown in FIG. 1 in the next step SP14, so that the execution of the printer driver processing is ended.

Referring back to FIG. 1, the thermal transfer printer 1 receives the printing command with the printing image data D1 from the computer 2 to convert this printing image data D1 to pulse data D2 and thermally transfer (print) the respective inks to the paper Pa based on the pulse data D2.

As described above, the printing image data generating device according to the present embodiment is a device that generates the printing image data D1 used for the thermal transfer printer 1 that performs heating for the thermal head 10, which presses the paper Pa conveyed along the sub scanning direction together with the ribbon Rb and involves generation of friction force depending on the grayscale value of the pixel at the pressed part, depending on the grayscale values of the respective pixels to thereby thermally transfer the ink of the ribbon Rb to the paper Pa on a line-by-line basis. This printing image data generating device includes the following sections: the image data acquirer 21 that acquires the image data D0 as the printing subject; the density deviation line specifying section 22 that specifies density deviation lines (y=k to k+p) at which the density after printing is estimated to deviate from desired density attributed to sudden change in the friction force per one line among the plural lines configuring the image data D0 acquired by the image data acquirer 21 based on the grayscale values of the pixels configuring the respective lines; the correction-subject pixel specifying section 23 that specifies, as the correction-subject pixel, the pixel whose variation degree of the grayscale value in the predetermined evaluation area Ar including at least the peripheral pixels adjacent on both sides in the sub scanning direction is lower than a predetermined value among the plural pixels configuring the density deviation lines (y=k to k+p) specified by the density deviation line specifying section 22; the correcting section 24 that corrects the grayscale value of the correction-subject pixel specified by the correction-subject pixel specifying section 23 in such a direction as to eliminate density deviation; and the generating section 25 that generates the printing image data D1 based on the image data after correction, obtained by the correcting section 24.

The predetermined evaluation area Ar means an area that includes the peripheral pixels ($D_{ij-1}$, $D_{ij+1}$) adjacent on both sides of the pixel $D_{ij}$ as the evaluation subject as to whether or not it is the correction-subject pixel in the sub scanning direction, and includes the pixels that are separate from the evaluation-subject pixel $D_{ij}$ by the predetermined distance w along the sub scanning direction. The size of this area is accordingly set.

In this manner, density deviation lines (y=k to k+p) at which the density after printing is estimated to deviate from desired density attributed to sudden change in the friction force per one line are specified among the plural lines configuring the image data D0 as the printing subject based on the grayscale values of the pixels configuring the respective lines. Subsequently, the pixel whose variation degree of the grayscale value in the predetermined evaluation area Ar including at least the peripheral pixels existing on both sides in the sub scanning direction is lower than a predetermined value is specified as the correction-subject pixel among the plural pixels configuring the specified density deviation lines (y=k to k+p). Then, the grayscale value of the specified correction-subject pixel is corrected in such a direction as to eliminate density deviation, and thermal transfer is performed based on the printing image data D1 generated based on the image data after correction. Therefore, density deviation can be decreased or eliminated and the printing quality can be enhanced by correcting the grayscale value of the pixel that has a low variation degree of the grayscale value in the predetermined evaluation area Ar including peripheral pixels and involves conspicuous density deviation, among the plural pixels existing on the lines associated with density deviation, in such a direction as to eliminate the density deviation. In addition, in the present embodiment, the correction is not performed for the pixel that has a high variation degree of the grayscale value in the predetermined evaluation area Ar and has inconspicuous density deviation. Thus, the deterioration of the printing quality due to excessive correction can also be avoided.

In particular, in the present embodiment, the density deviation line specifying section 22 compares the grayscale values between lines adjacent to each other in the sub scanning direction (e.g. y=k and y=k−1) to thereby specify, as a start line, the line (e.g. y=k) whose difference in the friction force per one line from the line of the previous thermal transfer (e.g. y=k−1) surpasses a predetermined value among the plural lines configuring the image data D0. Furthermore, the density deviation line specifying section 22 specifies the lines from the specified start line (e.g. y=k) to the line for which thermal transfer is performed a further predetermined number p of lines later (e.g. y=k+p) as density deviation lines. Thus, the density deviation can be properly corrected for not only the start line (e.g. y=k), where sudden friction force change occurs, but also the line that exists on the later printing side by the predetermined number p of lines and is affected by this friction force change (e.g. y=k+p). This can enhance the printing quality compared with the case of correcting only the start line (e.g. y=k).

Furthermore, in the present embodiment, the density deviation line specifying section 22 specifies, as the start line, the line (e.g. y=k) that meets a determination condition that the line has at least a predetermined number N of pixels $D_{ij}$ whose grayscale difference from the pixel $D_{ij-1}$ ($|D_{ij}-D_{ij-1}|$), which exists on the line of the previous thermal transfer (e.g. y=j−1) and is adjacent along the sub scanning direction, surpasses the predetermined threshold L. Thus, whether or not the line of interest is the start line can be properly specified.

Moreover, in the present embodiment, the correcting section 24 performs correction by using a correction value with the magnitude depending on at least one of the predetermined threshold L and the predetermined number N. Therefore, because the amount of speed change also changes depending on the predetermined threshold L and the predetermined number N, i.e. the amount of change in the friction force, and the amount of density deviation also changes, the correction can be performed with the proper amount depending on this amount of density deviation and the printing quality can be further enhanced.

The computer program according to the present embodiment is a computer program that causes the computer 2 to generate the printing image data D1 used for the thermal transfer printer 1 that performs heating for the thermal head 10, which presses the paper Pa conveyed along the sub scanning direction together with the ribbon Rb and involves generation of friction force depending on the grayscale value of the pixel at the pressed part, depending on the grayscale values of the respective pixels to thereby thermally transfer the ink of the ribbon Rb to the paper Pa on a line-by-line basis. This computer program causes the computer 2 to carry out the following steps: a step of acquiring the image data D0 as the printing subject (SP1 and SP2); a step of specifying density deviation lines at which the density after printing is estimated to deviate from desired density attributed to sudden change in the friction force per one line among the plural lines configuring the acquired image data D0 based on the grayscale values of the pixels configuring the respective lines (SP3 to SP8); a step of specifying, as the correction-subject pixel, the pixel whose variation degree of the grayscale value in the predetermined evaluation area Ar including at least the peripheral pixels adjacent on both sides in the sub scanning direction is lower than a predetermined value among the plural pixels configuring the specified density deviation lines (SP9 to SP11); a step of correcting the grayscale value of the specified correction-subject pixel in such a direction as to eliminate density deviation (SP12); and a step of generating the printing image data D1 based on the image data after correction (SP13). Also by running this computer program, the operation and effects provided by the above-described printing image data generating device can be achieved. In other words, it can be said that this computer program is run by using a method for generating the printing image data including the above-described steps.

Although embodiments of the present invention are described above based on the drawings, it should be understood that the specific configuration is not limited by these embodiments. The range of the present invention is indicated by not only the explanation of the above-described embodiment but also the scope of claims, and all changes that come within meaning and range of equivalency of the scope of claims are included therein.

Figure 8:
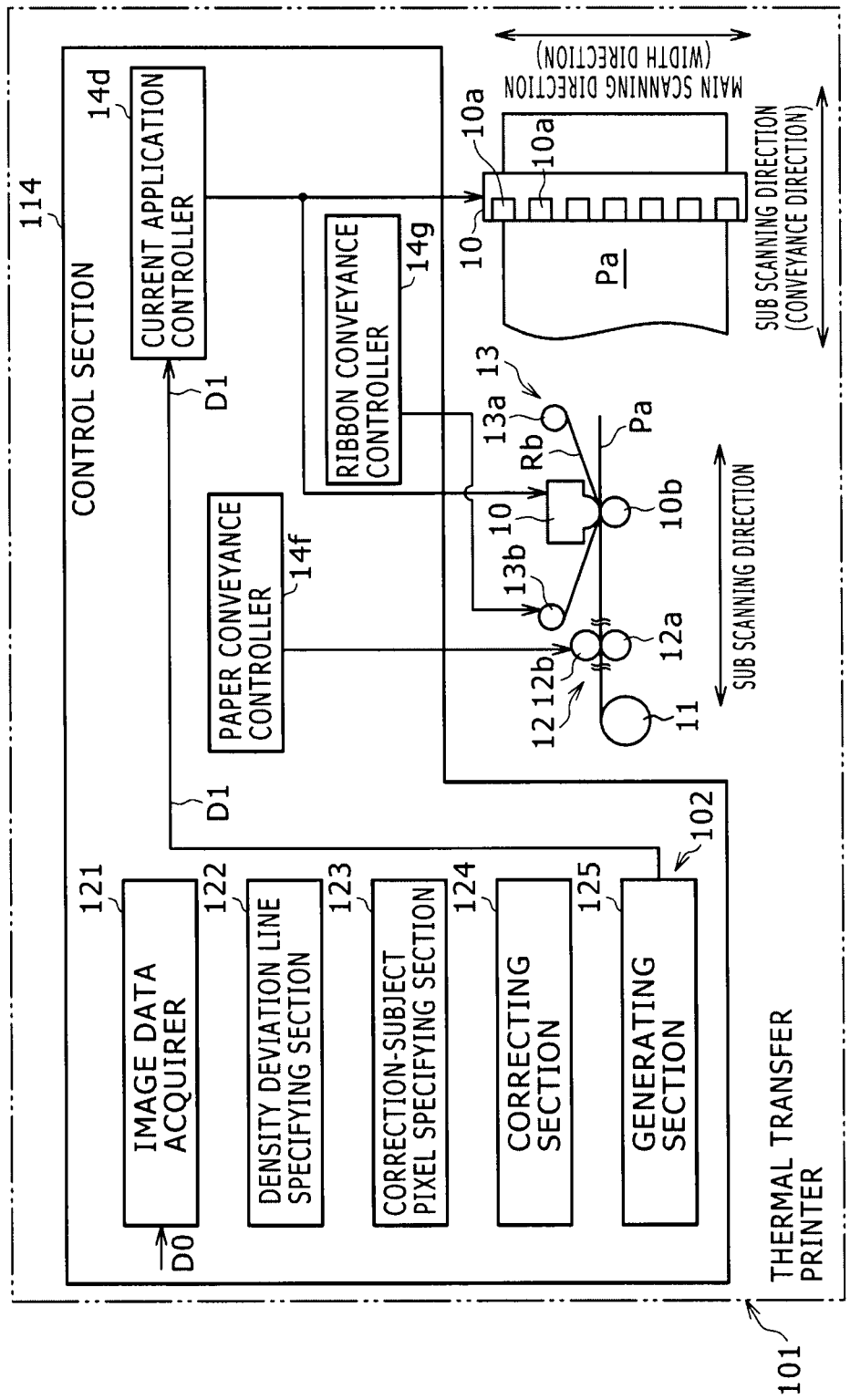
FIG. 8 is a configuration diagram schematically showing a thermal transfer printer according to another embodiment of the present invention.

For example, in the present embodiment, the printing image data generating device is realized in the computer 2 outside the thermal transfer printer 1. However, as shown in FIG. 8, a printing image data generating device 102 may be incorporated in a thermal transfer printer 101. Specifically, it is also possible to employ a configuration in which a control section 114 of the printer 101 runs a program equivalent to the above-described printer driver to thereby realize an image data acquirer 121, a density deviation line specifying section 122, a correction-subject pixel specifying section 123, a correcting section 124, and a generating section 125. If such a configuration is employed, printing with enhanced printing quality can be realized even when image data that does not pass through the above-described printing image data generating device is input, and it is also possible to omit maintenance of the peripheral computer such as a host computer.

Furthermore, in the present embodiment, in specifying of the start line, the grayscale values are compared between pixels adjacent to each other in the sub scanning direction. However, e.g. the following configuration may be employed.

Specifically, the total of the grayscale values of the pixels configuring a certain line is compared with the total of the grayscale values of the pixels configuring the line of the previous thermal transfer of this certain line. Then, if the difference thereof surpasses a predetermined value, it is specified that the certain line is a start line.

Moreover, in the present embodiment, the respective sections 21 to 25 shown in FIG. 1 are realized through running of a predetermined program by the CPU 26. However, the respective sections may be configured by dedicated memory and dedicated circuit.

The specific configurations of the respective sections are not limited to the above-described embodiment and various changes can be made without departing from the gist of the present invention.

What is claimed is:

1. An apparatus for generating printing image data used for a thermal transfer printer having a thermal head that extends in a scanning direction and thermally transfers ink of a ribbon onto paper on a line-by-line basis, the thermal head pressing the ribbon onto the paper conveyed with the ribbon along a sub scanning direction perpendicular to the scanning direction, the apparatus comprising:
an image data acquirer configured to acquire input image data as a printing subject, the input image data being for plural lines each having plural pixels;
a density deviation line specifying section configured to specify, of the plural lines, density deviation lines predicted to exhibit a deviation in printing density from a predetermined printing density due to a change in friction force between the thermal head and the ribbon at the density deviation lines, the change in the friction force being based on grayscale values of the pixels included in the plural lines;
a correction-subject pixel specifying section configured to specify any particular pixel in the density deviation lines as a correction-subject pixel when a variation degree of the grayscale value between the correction-subject pixel and other pixels in a predetermined evaluation area is lower than a first predetermined value, the predetermined evaluation area including at least the particular pixel and two pixels adjacent to the particular pixel in the sub scanning direction;
a correcting section configured to correct the grayscale value of the correction-subject pixel and to generate a corrected grayscale value such that the deviation of the printing density at the correction-subject pixel is reduced; and
a generating section configured to generate the printing image data based on the input image data and the corrected grayscale value generated by the correcting section.

2. The apparatus according to claim 1,
wherein the density deviation line specifying section compares grayscale values of pixels between two adjacent lines of the plural lines in the sub scanning direction, specifies a start line of the density deviation lines wherein the start line has the grayscale values different from grayscale values of a previous adjacent line by more than a second predetermined value, and further specifies a first predetermined number of lines from the specified start line as the density deviation lines.

3. The apparatus according to claim 2,
wherein the density deviation line specifying section specifies the start line when the start line has at least a second predetermined number of pixels whose grayscale values are different by a predetermined threshold from those of adjacent pixels of a previous adjacent line.

4. The apparatus according to claim 3,
wherein the correcting section corrects the grayscale value of the correction-subject pixel in accordance with a correction value which depends on at least one of the predetermined threshold and the second predetermined number.

5. The apparatus according to claim 2,
wherein the density deviation line specifying section compares total grayscale values of pixels for an entire line between two adjacent lines in the sub scanning direction and specifies the start line based on a comparison of the total values.

6. The apparatus according to claim 2,
wherein the correcting section corrects the grayscale value of the correction-subject pixel so that a degree of correction is largest for start line correction-subject pixels and becomes smaller for correction-subject pixels on density deviation lines further from the start line.

7. The apparatus according to claim 1,
wherein the correction-subject pixel specifying section determines a variation degree of grayscale values of pixels in the predetermined evaluation area based on fast Fourier transform (FFT) analysis of the grayscale values of the pixels in the predetermined evaluation area.

8. The apparatus according to claim 1,
wherein the ribbon includes a plurality of ordered sets of at least three color ink sections,
wherein the input image data includes at least three sets of input image data corresponding to the at least three color ink sections, respectively, and
wherein each of the density deviation line specifying section, the correction-subject pixel specifying section, the correction section and the generating section operates independently for each of the at least three sets of input image data.

9. A thermal transfer printer comprising:
a thermal head that extends in a scanning direction and thermally transfers ink of a ribbon onto paper on a line-by-line basis, the thermal head pressing the ribbon onto the paper conveyed with the ribbon along a sub scanning direction perpendicular to the scanning direction;
an image data acquirer configured to acquire input image data as a printing subject, the input image data being for plural lines each having plural pixels;
a density deviation line specifying section configured to specify, of the plural lines, density deviation lines predicted to exhibit a deviation in printing density from a predetermined printing density due to a change in friction force between the thermal head and the ribbon at the density deviation lines, the change in the friction force being based on grayscale values of the pixels included in the plural lines;
a correction-subject pixel specifying section configured to specify any particular pixel in the density deviation lines as a correction-subject pixel when a variation degree of the grayscale value between the correction-subject pixel and other pixels in a predetermined evaluation area is lower than a first predetermined value, the predetermined evaluation area including at least the particular pixel and two pixels adjacent to the particular pixel in the sub scanning direction;
a correcting section configured to correct the grayscale value of the correction-subject pixel and to generate a corrected grayscale value such that the deviation of the printing density at the correction-subject pixel is reduced; and a generating section configured to generate the printing image data based on the input image data and the corrected grayscale value generated by the correcting section.

10. The thermal transfer printer according to claim 9, further comprising:

a platen roller configured to press the paper and the ribbon toward the thermal head, the paper and the ribbon being pressed between the platen roller and the thermal head.

11. A non-transitory computer-readable medium having instructions recorded thereon that perform a method when executed by a computer, the computer generating printing image data used for a thermal transfer printer having a thermal head that extends in a scanning direction and thermally transfers ink of a ribbon onto paper on a line-by-line basis, and the thermal head pressing the ribbon onto the paper conveyed with the ribbon along a sub scanning direction perpendicular to the scanning direction, the method comprising:

acquiring input image data as a printing subject, the input image data having plural lines each having plural pixels;

specifying density deviation lines of the plural lines including predicting which density deviation lines exhibit a deviation in printing density from a predetermined printing density due to a change in friction force between the thermal head and the ribbon at the density deviation lines, the change in the friction force being based on grayscale values of the pixels included in the plural lines;

specifying any particular pixel in the density deviation lines as a correction-subject pixel when a variation degree of the grayscale value between the correction-subject pixel and other pixels in a predetermined evaluation area is lower than a first predetermined value, the predetermined evaluation area including at least the particular pixel and two pixels adjacent to the particular pixel in the sub scanning direction;

correcting the grayscale value of the specified correction-subject pixel, and generating a corrected grayscale value such that the deviation of the printing density at the correction-subject pixel is reduced; and generating the printing image data based on the input image data and the corrected grayscale value.

* * * * *